(12) United States Patent
Muranaka (10) Patent No.: US 10,471,509 B2
(45) Date of Patent: Nov. 12, 2019

(54) LAMINATION MOLDING APPARATUS

(71) Applicant: Sodick Co., Ltd., Kanagawa (JP)

(72) Inventor: Katsutaka Muranaka, Kanagawa (JP)

(73) Assignee: Sodick Co., Ltd., Kanagawa (JP)

( * ) Notice: Subject to any disclaimer, the term of this patent is extended or adjusted under 35 U.S.C. 154(b) by 407 days.

(21) Appl. No.: 15/603,470

(22) Filed: May 24, 2017

(65) Prior Publication Data

US 2018/0015542 A1     Jan. 18, 2018

(30) Foreign Application Priority Data

Jul. 13, 2016   (JP) .................................. 2016-138361

(51) Int. Cl.
    *B22F 3/105*      (2006.01)
    *B33Y 30/00*      (2015.01)

(52) U.S. Cl.
    CPC ............ *B22F 3/1055* (2013.01); *B33Y 30/00* (2014.12); *B22F 2003/1059* (2013.01)

(58) Field of Classification Search
    CPC ....................... B22F 3/1055; B22F 2003/1056
    See application file for complete search history.

(56) References Cited

U.S. PATENT DOCUMENTS 9,592,636 B2     3/2017   Araie et al.

FOREIGN PATENT DOCUMENTS

| JP | S5858158 | 4/1983 |
|---|---|---|
| JP | H0422049 | 2/1992 |
| JP | 4131260 | 8/2008 |
| JP | 2016006215 | 1/2016 |

*Primary Examiner* — James Sanders
(74) *Attorney, Agent, or Firm* — JCIPRNET (57) ABSTRACT

A fume collector can be operated continuously for a long time, and an influence on a three-dimensional article is minimized.
Provided is a lamination molding apparatus (1) in which an inert gas supply/discharge apparatus (4) includes an inert gas supply apparatus (43) configured to supply an inert gas into a chamber (10), and a fume collector (6) including a charging section (63) having a charging electrode (631) configured to positively or negatively charge fumes, a charging electrode cleaner (71) configured to remove fumes adhered to the charging electrode (631) and a dust collecting section (65) configured to collect the charged fumes, wherein the charging electrode cleaner (71) removes the fumes when formation of the sintered layers by a laser radiation apparatus (2) is not being performed in operation.

6 Claims, 7 Drawing Sheets

FIG. 8

LAMINATION MOLDING APPARATUS

CROSS-REFERENCE TO RELATED APPLICATION

This application claims the priority benefit of Japan application serial no. 2016-138361, filed on Jul. 13, 2016. The entirety of the above-mentioned patent application is hereby incorporated by reference herein and made a part of this specification.

BACKGROUND OF THE INVENTION

Field of the Invention

The present invention relates to a lamination molding apparatus.

Description of Related Art

In a selective laser sintering method using a laser beam, a powder material layer is formed by uniformly spreading a powder material on a molding table, a sintered layer is formed by radiating a laser beam to a predetermined place in the powder material layer and sintering the powder material layer, a new powder material layer is formed by uniformly spreading a powder material on the sintered layer, a new sintered layer adhered to an underlying sintered layer is formed by radiating a laser beam on the new powder material layer and sintering the new powder material layer, and a desired three-dimensionally molded article which is an integrated sintered body is formed by repeating the above-mentioned processes and laminating a plurality of sintered layers.

In particular, when a metal powder material is sintered by the laser beam, in order to protect the powder material from deterioration and enable stable radiation of the laser beam with required energy, a state in which no oxygen is present as possible around a predetermined molding region should be maintained. For this reason, a lamination molding apparatus for performing a method for selective laser sintering of metals using a laser beam is configured to supply an inert gas such as nitrogen gas into a closed chamber and radiate a laser beam to a predetermined irradiation region under an atmosphere in which an oxygen concentration in the chamber is sufficiently low.

In addition, when the metal powder material is irradiated with the laser beam and sintered, some of the metal material becomes vapor, and specific smoke, which is referred to as fumes, is generated. When the fumes fill the chamber, the laser beam may be shielded, the laser beam having required energy may not reach a sintered position, and an inferior sintering may occur.

For this reason, in the lamination molding method using a laser beam, the fumes need to be removed from the chamber while maintaining a low oxygen atmosphere inside the chamber. As disclosed in Patent Literature 1, a lamination molding apparatus for discharging an inert gas including fumes from the chamber while supplying a clean inert gas into the chamber is known. In addition, in the lamination molding apparatus according to Patent Literature 1, the inert gas in the chamber is circulated by removing the fumes from the inert gas including the fumes discharged outside of the chamber and returning the inert gas into the chamber again. As a result, the chamber is configured such that a clean inert gas atmosphere is maintained inside thereof.

In addition, an electrostatic precipitator referred to as a fume collector may be used as an apparatus for removing fumes from an inert gas. In general, an electrostatic precipitator includes a charging section having a charging electrode configured to charge fumes and other dust positively or negatively through corona discharge, and a dust collecting section configured to collect the charged dust using Coulomb's force. While using such an electrostatic precipitator, dust is also gradually deposited on the charging electrode, and corona discharge cannot then be performed normally. For this reason, cleaning and removing of the dust deposited on the charging electrode needs to be performed periodically, and for example, as disclosed in Patent Literature 2, an electrostatic precipitator configured to remove dust attached to a charging electrode through air blowing is known.

PATENT LITERATURE

Patent Literature 1: Japanese Patent No. 4131260
Patent Literature 2: Japanese Utility Model Publication No. H04-022049

SUMMARY OF THE INVENTION

When cleaning of the charging electrode is performed, since the removed dust rises up temporarily, charging to the electrode needs to be interrupted. For this reason, during cleaning of the charging electrode, a dust collecting capacity is temporarily decreased. In the lamination molding apparatus including such an electrostatic precipitator as a fume collector, when cleaning of the charging electrode is performed during formation of the sintered layers, the generated fumes cannot be removed sufficiently and the quality of molding may deteriorate.

In consideration of the above-mentioned circumstances, the present invention is mainly directed to providing a lamination molding apparatus in which a fume collector is able to be continuously operated for a long time by removing fumes attached to a charging electrode while formation of a sintered layer is not being performed, and minimizing an influence on a three-dimensional article due to a temporary decrease in a dust collecting capacity.

The present invention provides a lamination molding apparatus including: a chamber that is closed; a laser radiation apparatus configured to radiate a laser beam to a predetermined irradiation region on a powder material layer formed by uniformly spreading a powder material in the chamber and form a sintered layer; and an inert gas supply/discharge apparatus configured to supply an inert gas into the chamber such that the chamber is always filled with the inert gas to a predetermined concentration or more and discharge fumes to the outside of the chamber, wherein the inert gas supply/discharge apparatus includes: an inert gas supply apparatus configured to supply the inert gas into the chamber; and a fume collector including a charging section having a charging electrode configured to positively or negatively charge the fumes, a charging electrode cleaner configured to remove the fumes adhered to the charging electrode, and a dust collecting section configured to collect the charged fumes, wherein the charging electrode cleaner removes the fumes when formation of the sintered layers is not being performed by the laser radiation apparatus in operation.

In the lamination molding apparatus according to the present invention, the charging electrode cleaner configured to remove the fumes adhered to the charging electrode of the fume collector is provided, and the charging electrode cleaner removes the fumes when formation of the sintered layers by the laser radiation apparatus is not being performed. For this reason, the fume collector can be operated continuously for a long time, and an influence on a decrease in dust collecting capacity during cleaning of the charging electrode can be minimized.

DETAILED DESCRIPTION OF THE INVENTION

Hereinafter, an embodiment of the present invention will be described with reference to the accompanying drawings. Variants of a plurality of components to be described below may be arbitrarily combined and implemented.

Figure 1:
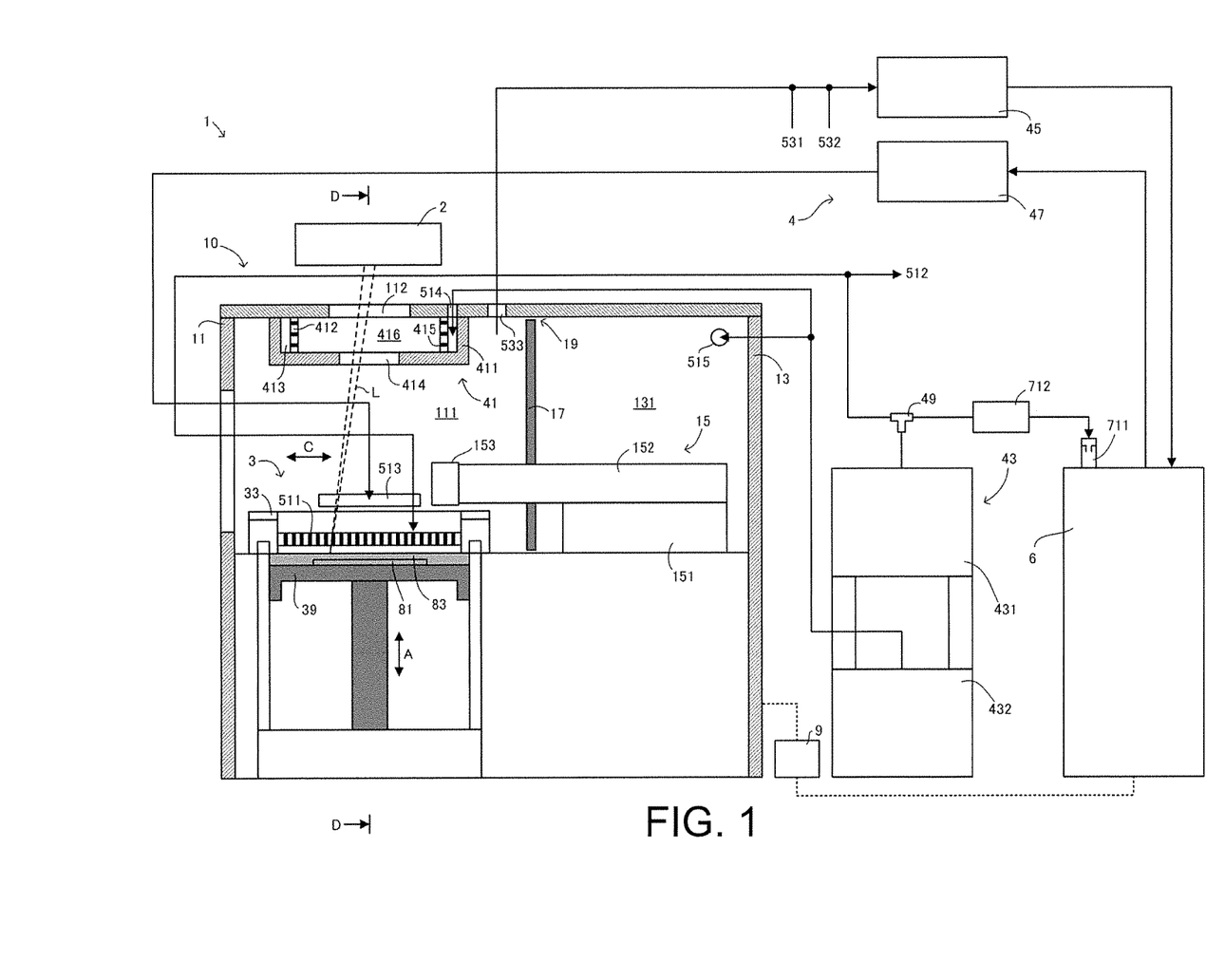
FIG. 1 is a configuration view of a lamination molding apparatus 1 of an embodiment of the present invention.

As shown in FIG. 1, a lamination molding apparatus 1 of the embodiment of the present invention includes a chamber 10 configured to be substantially closed. The chamber 10 is partitioned into a front chamber 11 having a molding chamber 111 configured to perform formation of a three-dimensional article and a rear chamber 13 having a driving chamber 131, in which most of a processing head driving apparatus 15 is accommodated, by a bellows 17. A communication section 19 having a slight gap through which an inert gas can pass is present between the molding chamber 111 and the driving chamber 131.

The processing head driving apparatus 15 is constituted by a Y-axis driving apparatus 152 configured to move a processing head 153 disposed in the molding chamber 111 in a Y-axis direction and an X-axis driving apparatus 151 configured to move the Y-axis driving apparatus 152 in an X-axis direction. The processing head 153 includes a spindle head (not shown) and a Z-axis driving apparatus (not shown) configured to move the spindle head in a Z-axis direction. The spindle head is configured such that a cutting tool such as an end mill or the like can be mounted on the spindle head and rotated. Note that the X-axis is a horizontal control axis of the processing head 153, the Y-axis is a horizontal control axis perpendicular to the X-axis, and the Z-axis is a vertical control axis of the processing head 153. According to the above-mentioned configuration, the processing head 153 is configured to move the spindle head to an arbitrary position in the molding chamber 111 such that cutting with respect to a sintered layer can be performed. Cutting with respect to the sintered layers using the cutting tool may be performed whenever a predetermined number of sintered layers are formed. In addition, also when a recoater head 33 collides with a protrusion of the sintered layer, cutting with respect to the sintered layer may be performed to remove the protrusion.

Figure 2:
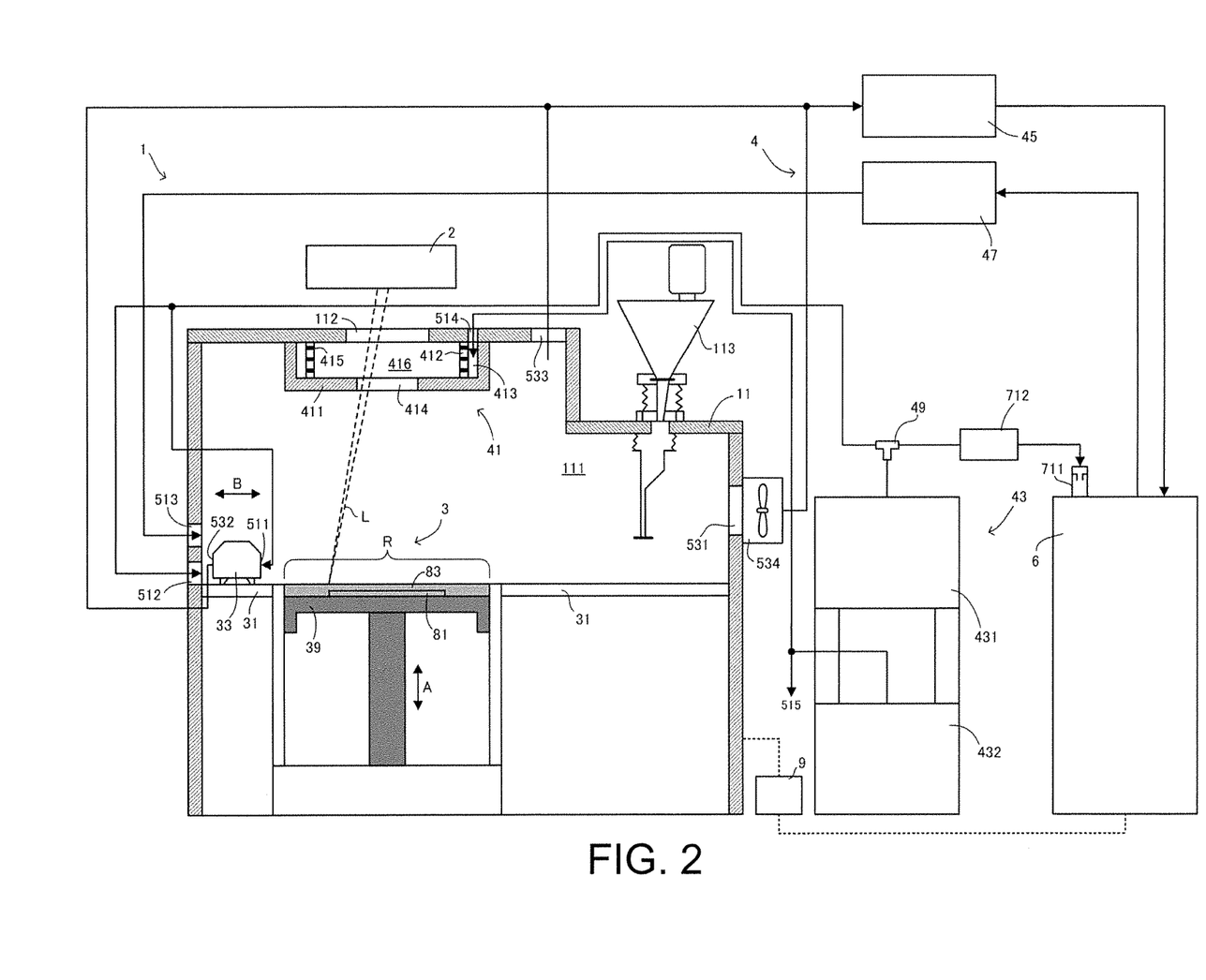
FIG. 2 is a cross-sectional view taken along line D-D of FIG. 1, showing only a front chamber 11.

As shown in FIG. 2, a powder layer forming apparatus 3 is installed in the front chamber 11. The powder layer forming apparatus 3 includes a base frame 31 having a molding region R, and the recoater head 33 disposed on the base frame 31 and movable in a horizontal single axis direction (an arrow B direction). A molding table 39 movable in an upward/downward direction (an arrow A direction) is installed in the molding region R. During use of the lamination molding apparatus 1, a molding plate 81 is disposed on the molding table 39 and a powder material layer 83 is formed thereon. The molding region R corresponds to substantially the entire upper surface of the molding table 39 showing a work region in which the molding is performed, i.e., the entire maximum region in which the powder material layer 83 can be formed to form the sintered layers and the three-dimensional article can be generated.

Figure 3:
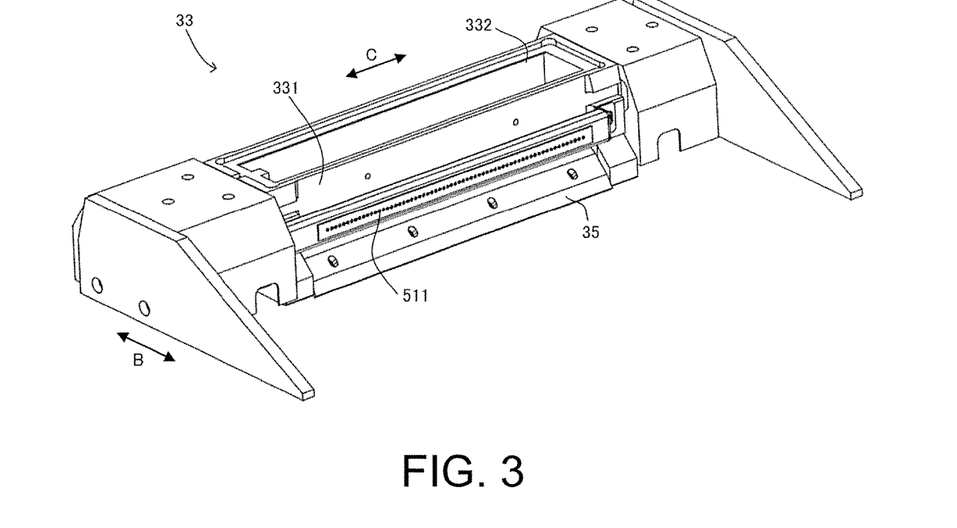
FIG. 3 is a perspective view of a recoater head 33.
Figure 4:
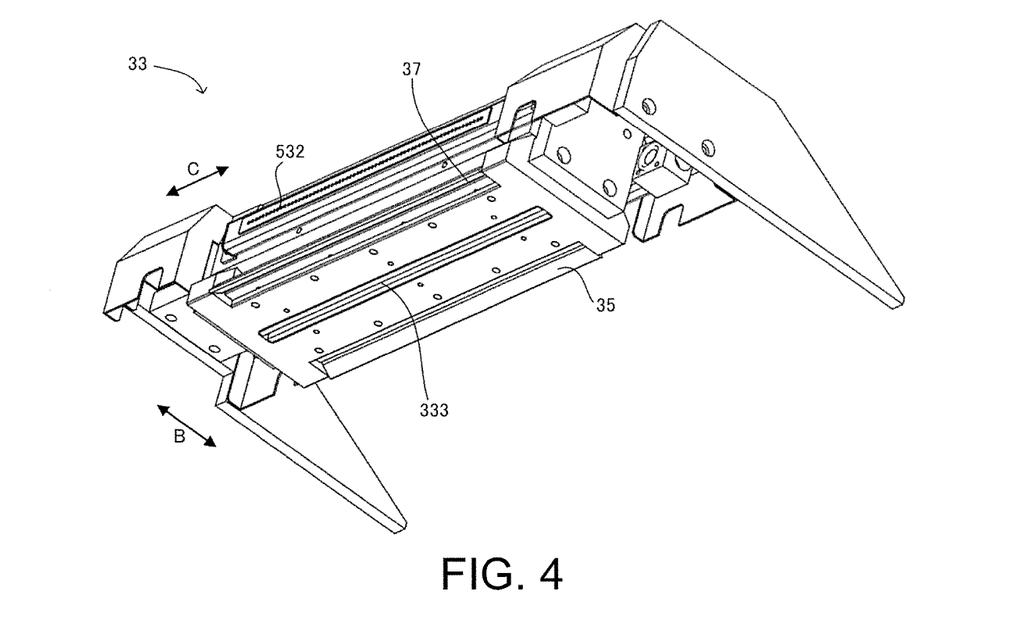
FIG. 4 is a perspective view of the recoater head 33 when seen from another angle.

As shown in FIGS. 3 and 4, the recoater head 33 includes a material accommodating section 331 configured to store a powder material supplied from a material supply apparatus 113, a material supply unit 332 installed on an upper surface of the material accommodating section 331 and serving as a receiving mouth for the powder material, and a material ejection unit 333 installed on a bottom surface of the material accommodating section 331 and configured to eject the powder material in the material accommodating section 331. The material ejection unit 333 has a slit shape extending in a horizontal single axis direction (an arrow C direction) perpendicular to the moving direction (the arrow B direction) of the recoater head 33. In addition, a pair of blades 35 and 37 are installed on both side surfaces of the recoater head 33, respectively. The blades 35 and 37 planarize a powder material discharged from a material discharge unit to form the powder material layer 83. Further, the powder material is a metal powder such as an iron powder or the like, and for example, has a spherical shape having an average powder particle diameter of 20 µm.

A laser radiation apparatus 2 is installed above the front chamber 11, and a laser beam L output from the laser radiation apparatus 2 passes through a window 112 installed in the front chamber 11 to be radiated to a predetermined irradiation region of the powder material layer 83 formed on the molding region R to form sintered layers. The predetermined irradiation region is present in the molding region R and approximately coincides with a region surrounded by an outline shape of a desired three-dimensional article. The laser radiation apparatus 2 may be configured to two-dimensionally scan the laser beam L in the molding region R, and for example, includes a laser source configured to generate a laser beam L, and a pair of galvano scanners configured to two-dimensionally scan the laser beam L in the molding region R. The type of the laser beam L is not limited as long as the powder material can be sintered, and for example, may be a CO2 laser, a fiber laser, a YAG laser, and so on. The window 112 is formed of a material through which the laser beam L can pass. For example, when the laser beam L is a fiber laser or a YAG laser, the window 112 may be formed of quartz glass.

A fume diffusion apparatus 41 is installed on an upper surface of the front chamber 11 to cover the window 112. The fume diffusion apparatus 41 includes a tubular housing 411, and a tubular diffusion member 412 disposed in the housing 411. An inert gas supply space 413 is formed between the housing 411 and the diffusion member 412. In addition, an opening section 414 is formed in a bottom surface of the housing 411 inside the diffusion member 412. A plurality of pores 415 are formed in the diffusion member 412, and a clean inert gas supplied into the inert gas supply space 413 is filled into a clean room 416 through the pores 415. Then, the clean inert gas filled into the clean room 416 is ejected to below the fume diffusion apparatus 41 through the opening section 414. The fume diffusion apparatus 41 prevents the window 112 from being contaminated with the fumes generated when the sintered layers are formed, and helps eliminate the fumes that traverse a radiation path of the laser beam L from the radiation path and transfer the fumes toward side plates of the front chamber 11.

Next, an inert gas supply/discharge apparatus 4 will be described. The inert gas supply/discharge apparatus 4 includes the fume diffusion apparatus 41, an inert gas supply apparatus 43, a fume collector 6, duct boxes 45 and 47, supply ports 511, 512, 513, 514 and 515 and discharge ports 531, 532 and 533 for an inert gas, and pipes connected to the parts. Further, the inert gas is a gas that does not react with the powder material substantially, and an appropriate gas is selected from nitrogen gas, argon gas, helium gas, and so on, according to the kind of the powder material.

In the embodiment, a recoater head supply port 511, a chamber supply port 512, a subsidiary supply port 513, a fume diffusion apparatus supply port 514 and a driving chamber supply port 515 are installed as the supply ports for the inert gas. In addition, a chamber discharge port 531, a recoater head discharge port 532 and a subsidiary discharge port 533 are installed as the discharge ports for the inert gas.

The recoater head supply port 511 is installed to correspond to an installation position of the chamber discharge port 531 and faces the chamber discharge port 531. Preferably, the recoater head supply port 511 is installed on one side of the recoater head 33 along the arrow C direction to face the chamber discharge port 531 when the recoater head 33 is disposed at an opposite side with respect to an installation position of the material supply apparatus 113 with a predetermined irradiation region sandwiched therebetween.

The chamber discharge port 531 is installed on a side plate of the front chamber 11 and is separated by a predetermined distance from a predetermined irradiation region to face the recoater head supply port 511. In addition, a suction apparatus 534 is installed by being connected to the chamber discharge port 531. The suction apparatus 534 helps efficiently eliminate the fumes from the radiation path of the laser beam L. In addition, a large amount of fumes can be discharged through the chamber discharge port 531 by the suction apparatus 534, and the fumes cannot easily diffuse into the molding chamber 111.

The chamber supply port 512 is installed on an end of the base frame 31 to face the chamber discharge port 531 with the predetermined irradiation region interposed therebetween. When the recoater head 33 passes through the predetermined irradiation region and the recoater head supply port 511 is disposed at a position directly facing the chamber discharge port 531 with the predetermined irradiation region not interposed therebetween, the recoater head supply port 511 is selectively switched to be opened, while the chamber supply port 512 is switched to be closed. For this reason, it is advantageous that a flow of the inert gas is always produced in the same direction and stable sintering is performed because the chamber supply port 512 supplies inert gas toward the chamber discharge port 531, wherein the inert gas has the same predetermined pressure and the same flow rate as the inert gas supplied from the recoater head supply port 511.

The recoater head discharge port 532 is installed along the arrow C direction on a side surface opposite to one side of the recoater head 33 on which the recoater head supply port 511 is installed. When the inert gas cannot be supplied from the recoater head supply port 511, in other words, when the inert gas is supplied from the chamber supply port 512, since the flow of the inert gas is produced at a place closer to the predetermined irradiation region and some of the fumes are discharged, the fumes can be more efficiently eliminated from the radiation path of the laser beam L.

In addition, the subsidiary supply port 513 is installed on the side plate of the front chamber 11 to face the chamber discharge port 531 and configured to supply a clean inert gas supplied from the fume collector 6 from which the fumes have been removed into the molding chamber 111. The fume diffusion apparatus supply port 514 is installed on the upper surface of the front chamber 11 and configured to supply the inert gas into the fume diffusion apparatus 41. The driving chamber supply port 515 is installed on the rear chamber 13 and configured to supply the inert gas into the driving chamber 131. The subsidiary discharge port 533 installed on the upper side of the chamber discharge port 531 and configured to discharge inert gas containing a large amount of remaining fumes in an upper side of the front chamber 11.

The inert gas supply apparatus 43 supplies the inert gas such as nitrogen or the like into the chamber 10. The inert gas supply apparatus 43 of the embodiment is constituted by the first inert gas supply apparatus 431 and the second inert gas supply apparatus 432. An apparatus capable of managing a concentration of the inert gas is preferable as the first inert gas supply apparatus 431. For example, the first inert gas supply apparatus 431 may be an apparatus including a film type nitrogen separator configured to extract nitrogen gas from surrounding air. While the second inert gas supply apparatus 432 may be an apparatus having the same configuration as the first inert gas supply apparatus 431, since the second inert gas supply apparatus 432 is connected to supply ports disposed at a position relatively far from the irradiation region where the importance of management of the inert gas concentration is relatively low, the second inert gas supply apparatus 432 may not have a function of managing a concentration of the inert gas. For example, the second inert gas supply apparatus 432 may be, for example, a nitrogen gas cylinder.

The fume collector 6 is, for example, an electrostatic precipitator configured to provide charge to the fumes in the inert gas through corona discharge and collect the fumes using Coulomb's force. The duct boxes 45 and 47 are installed on an upstream side and a downstream side of the fume collector 6, respectively. The inert gas containing the fumes discharged from the front chamber 11 is delivered to the fume collector 6 through the duct box 45, and the clean inert gas from which the fumes have been removed in the fume collector 6 is delivered to the subsidiary supply port 513 of the front chamber 11 through the duct box 47. Reuse of the inert gas becomes possible with the above-mentioned configuration.

As shown in FIGS. 1 and 2, for an inert gas supply system, the first inert gas supply apparatus 431 is connected to the recoater head supply port 511 and the chamber supply port 512, and the second inert gas supply apparatus 432 is connected to the fume diffusion apparatus supply port 514 and the driving chamber supply port 515. In addition, the fume collector 6 and the subsidiary supply port 513 are connected through the duct box 47. The first inert gas supply apparatus 431 and the second inert gas supply apparatus 432 supply clean inert gas having a predetermined pressure and flow rate into the chamber 10. The inert gas supplied into the rear chamber 13 is supplied into the molding chamber 111 through the communication section 19 between the molding chamber 111 and the driving chamber 131.

As shown in FIGS. 1 and 2, in a fume discharge system, the chamber discharge port 531, the recoater head discharge port 532 and the subsidiary discharge port 533 are connected to the fume collector 6 through the duct box 45. The clean inert gas after the fumes have been removed in the fume collector 6 is returned to the front chamber 11 to be reused.

Figure 5:
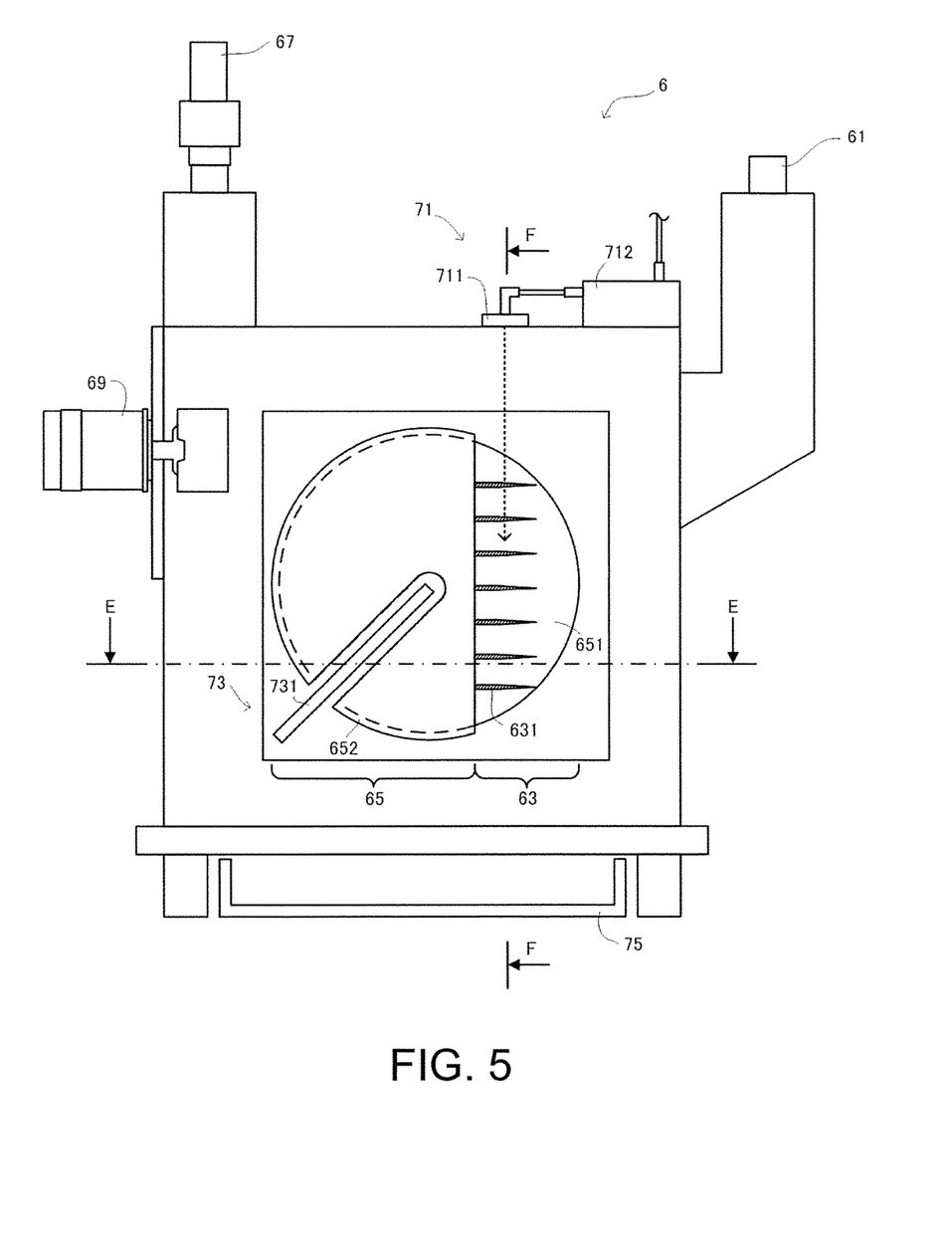
FIG. 5 is a configuration view showing a fume collector 6 in detail.
Figure 6:
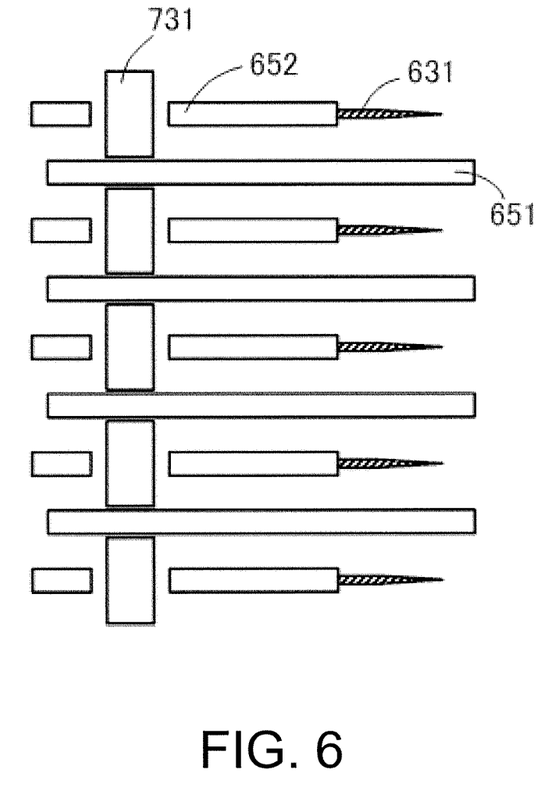
FIG. 6 is a cross-sectional view taken along line E-E of FIG. 5.

The fume collector 6 of the embodiment is a so-called one-stage type (Cottrell type) dry electrostatic precipitator in which a charging section 63 having a charging electrode 631 configured to positively charge the fumes and a dust collecting section 65 configured to collect the charged fumes are integrally formed. As shown in FIGS. 5 and 6, a plurality of positive electrode plates 652 are installed at predetermined intervals, and a plurality of charging electrodes 631 having a needle shape are attached to the positive electrode plates 652. The positive electrode plates 652 and the charging electrode 631 can be positively charged by a voltage supply element (not shown). Dust collecting plates 651 are installed in the intervals between the positive electrode plates 652. The dust collecting plates 651 are earthed and configured to be rotatable. Preferably, in order to efficiently circulate the inert gas in the fume collector 6, a fan motor 69 is installed.

Unclean inert gas containing a large amount of fumes discharged from the front chamber 11 are delivered from a suction port 61 to the charging section 63. The charging electrode 631 in the charging section 63 positively charges the fumes in the inert gas through corona discharge. The positively charged fumes are drawn to and collected on the dust collecting plates 651 while being repelled by the positive electrode plates 652 due to Coulomb's force in the dust collecting section 65. The clean inert gas, from which fumes have been removed, is returned to the front chamber 11 from a discharge port 67 via the duct box 47.

When the fumes are removed from the inert gas as described above, the fumes accumulate on the charging electrode 631 and the dust collecting plate 651. For this reason, the fume collector 6 includes a charging electrode cleaner 71 and a dust collecting plate cleaner 73, which serve as means configured to remove the fumes adhered to the charging electrode 631 and the dust collecting plate 651.

Figure 7:
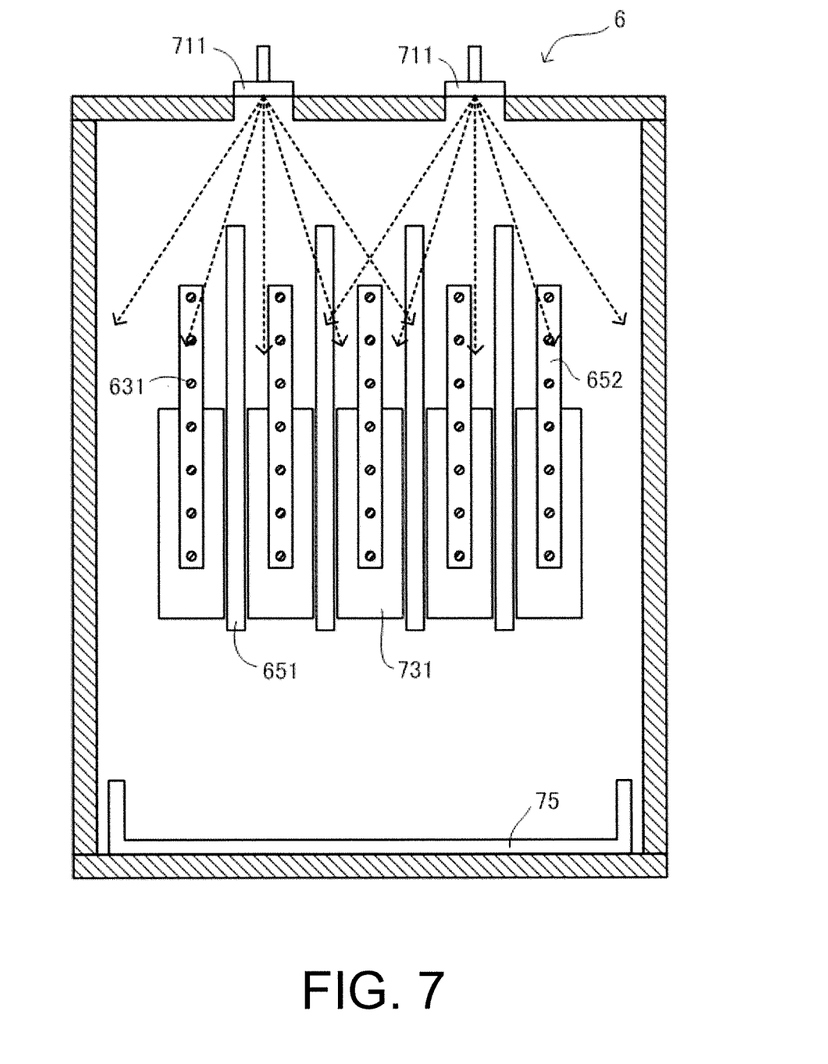
FIG. 7 is a cross-sectional view taken along line F-F of FIG. 5.

For example, the charging electrode cleaner 71 is configured to eject inert gas to the charging electrode 631 from a nozzle 711 installed above the charging electrode 631. The inert gas ejected from the nozzle 711 is preferably the same kind as the inert gas supplied into the chamber 10. In addition, the nozzles 711 are preferably formed of a non-conductive material such as a resin or the like such that a short circuit does not occur between the nozzles 711, the charging electrode 631 and the positive electrode plates 652, and preferably configured such that the charging electrode 631 can be cleaned over a large area by a small number of nozzles 711. For example, a fan-shaped nozzle configured to eject the inert gas in a fan shape to cover the entire charging electrode 631 as shown by dashed arrows in FIGS. 5 and 7 may be used as the nozzle 711.

Preferably, the charging electrode cleaner 71 further includes an intermittent ejection control unit 712 configured to control intermittent ejection of the inert gas from the nozzle 711. When the inert gas is intermittently ejected, a larger flow rate of inert gas can be injected to the charging electrode 631 than that during continuous injection, and cleaning efficiency is improved. In addition, the inert gas used in cleaning can be saved.

In addition, preferably, the inert gas supply/discharge apparatus 4 further includes a branch pipe 49 configured to split a supply destination of the inert gas supplied from the inert gas supply apparatus 43 into the chamber 10 and the nozzle 711. In the embodiment, specifically, as shown in FIGS. 1 and 2, the branch pipe 49 is installed between the first inert gas supply apparatus 431, the recoater head supply port 511 and the chamber supply port 512. As a result, there is no need to separately install an inert gas supply apparatus in order to clean the charging electrode 631, and costs can be reduced.

For example, the dust collecting plate cleaner 73 is constituted by a plate-shaped scraper 731 installed to approach or be close to a side surface of the dust collecting plate 651 as shown in FIGS. 5 and 6. In cleaning the dust collecting plate 651, the dust collecting plate 651 is rotated by a motor (not shown), and the adhered fumes are scraped away by the scraper 731.

The fumes removed by the charging electrode cleaner 71 and the dust collecting plate cleaner 73 drop onto a bucket 75 installed below the charging electrode 631 and the dust collecting plate 651.

Here, a lamination molding method in the lamination molding apparatus 1 of the embodiment will be described. First, the molding plate 81 is placed on the molding table 39 and a height of the molding table 39 is adjusted to an appropriate position. In this state, the recoater head 33 is moved from a left side to a right side of the molding region R in the arrow B direction, and the powder material layer 83 having a predetermined thickness is formed on the molding plate 81. Next, a sintered layer as a first layer is obtained by radiating the laser beam L to the powder material layer 83 in the predetermined irradiation region to sinter. Similarly, the height of the molding table 39 is lowered according to one layer of the powder material layer 83 and the recoater head 33 is moved from the right side to the left side of the molding region R, the powder material layer 83 having a predetermined thickness being formed to cover the sintered layer which is the first layer on the molding table 39. Next, a sintered layer as a second layer is obtained by radiating the laser beam L to the powder material layer 83 in the predetermined irradiation region to sinter. When the above-mentioned process is repeated, sintered layers as a third layer and subsequent layers are sequentially formed. Sintered layers adjacent above and below each other are strongly adhered.

In addition, whenever a predetermined number of sintered layers are formed, cutting with respect to the sintered layers may be performed. In addition, also when the recoater head 33 collides with a protrusion of the sintered layer, cutting with respect to the sintered layer may be performed to remove the protrusion.

That is, a lamination molding process is generally divided into a recoating process of forming the powder material layer 83 by lowering the molding table 39 and moving the recoater head 33, a radiation process of forming sintered layers by radiating the laser beam L to the powder material layer 83, and a cutting process of cutting the sintered layers. Of course, during the radiation process, fumes are newly generated.

Further, a control device 9 of the lamination molding apparatus 1 includes a timer to measure a radiation time which is a cumulative time of the radiation of the laser beam L. After a radiation time exceeds an arbitrarily determined set value, a cleaning start signal is output to the fume collector 6 when the next recoating process or cutting process starts. In other words, the control device 9 is configured to output the cleaning start signal at a predetermined timing when the radiation process is not being performed in operation.

Meanwhile, while the fume collector 6 in a normal state removes the fumes from the inert gas in operation of the lamination molding apparatus 1, cleaning of the charging electrode 631 and the dust collecting plate 651 starts when the cleaning start signal from the control device 9 of the lamination molding apparatus 1 is input.

Specifically, first, charging to the positive electrode plates 652 and the charging electrode 631 and rotation of the fan motor 69 are stopped. Next, the fumes adhered to the charging electrode 631 and the dust collecting plate 651 are removed through the above-mentioned method by the charging electrode cleaner 71 and the dust collecting plate cleaner 73. Then, charging to the positive electrode plates 652 and the charging electrode 631 and rotation of the fan motor 69 are started again, and a measured value of the timer is returned to 0. The above-mentioned cleaning process is terminated before the next radiation process starts.

According to the above-mentioned lamination molding apparatus 1, a continuous operation time of the fume collector 6 can be extended without exerting an influence on the quality or time of the molding.

Figure 8:
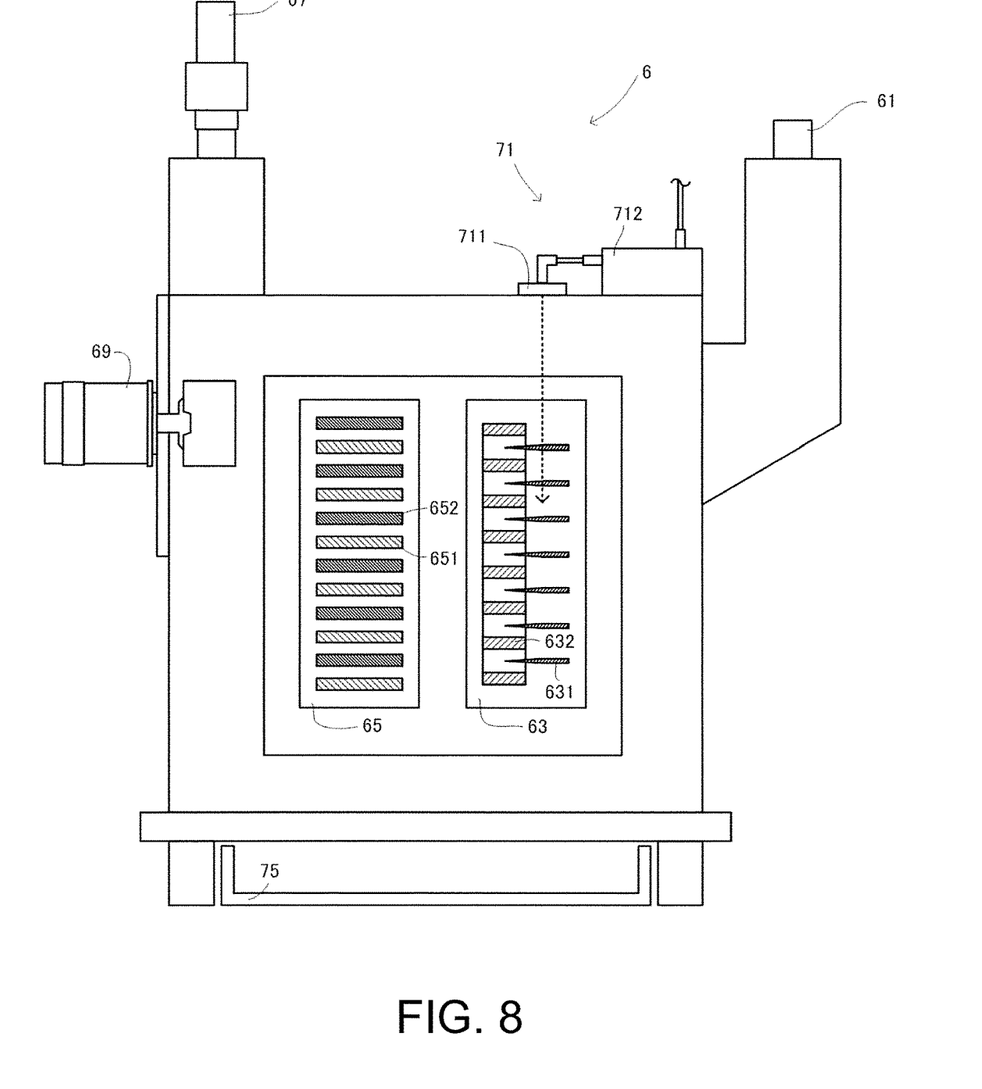
FIG. 8 is a configuration view of another embodiment of the fume collector 6 in detail.

Further, as shown in FIG. 8, the fume collector 6 may be a two-stage type (a Penney type) in which the charging section 63 and the dust collecting section 65 are separately installed. That is, the fume collector 6 of this variant includes the charging section 63 in which the charging electrode 631 that is positively charged and has a needle shape and a counter electrode 632 that is earthed are disposed to oppose each other, and the dust collecting section 65 in which the positive electrode plates 652 that is positively charged and the dust collecting plate 651 that is earthed are alternately installed. Further, in FIG. 8, components the same as in the configuration of the embodiment are designated by the same reference numerals.

In addition, a metal wire or a brush-shaped electrode may be used instead of the charging electrode 631 having the needle shape. In addition, charging the fumes negatively may also be performed by the charging electrode 631.

In addition, the charging electrode cleaner 71 may also have another configuration. For example, while a fan-shaped nozzle configured to eject the inert gas in a fan shape may be used as the nozzle 711 in the embodiment, a nozzle 711 configured to linearly eject inert gas toward the charging electrode 631 may be installed above each row of the charging electrodes 631.

In addition, the dust collecting plate cleaner 73 may have another configuration. For example, a configuration of performing cleaning through ejection of the inert gas from the nozzle 711 may be provided like in the charging electrode cleaner 71 of the embodiment, and a configuration of performing cleaning by applying vibration to the dust collecting plate 651 using a hammering apparatus or the like may be provided. When the fume collector 6 is a wet type electrostatic precipitator, cleaning may be performed by injection of a cleaning liquid such as water or the like.

In addition, the inert gas supply/discharge apparatus 4 may include a switching valve configured to switch the supply destination of the inert gas supplied from the inert gas supply apparatus 43 to either the chamber 10 or the nozzle 711 instead of the branch pipe 49. As described above, cleaning of the charging electrode 631 is performed when formation of the sintered layer is not being performed. For this reason, since the necessity of supplying the inert gas to the chamber 10, in particular, to the vicinity of the irradiation region during cleaning of the charging electrode 631 is low, the supply destination of the inert gas of the inert gas supply apparatus 43 can be switched to the nozzle 711. As a result, even when a supply amount of the inert gas of the inert gas supply apparatus 43 is relatively small, in cleaning the charging electrode 631, a sufficient flow rate can be secured.

In addition, while the cleaning process is performed during the recoating process or the cutting process in the embodiment, another configuration may be provided as long as the radiation process and the cleaning process are not simultaneously performed. For example, a configuration in which the cleaning process is performed only during the recoating process and the cleaning process is not performed during the cutting process to maintain the collection of the fumes may be provided. In addition, there may be a configuration in which a cleaning termination signal is output to the control device 9 of the lamination molding apparatus 1 from the fume collector 6 upon termination of the cleaning process and the control device 9 waits without starting the next radiation process until the cleaning termination signal is input. However, this configuration is not needed as long as a time required for the cleaning process is sufficiently smaller than the time of the recoating process or the cutting process.

In addition, there may be one, or three or more inert gas supply apparatuses 43. In addition, the number and positions of the supply/discharge ports for the inert gas installed on the chamber 10 may not be as in the embodiment as long as the chamber 10 is filled with the inert gas to a predetermined concentration and the fumes are appropriately discharged.

In addition, while the radiation time of the laser beam L is measured and the cleaning start signal is output after the radiation time exceeds a set value in the embodiment, another form may be provided as long as the cleaning start signal can be output at a predetermined timing when the radiation process is not being performed in operation. For example, the area or the number of sintered layers formation of which have been already performed is measured so that it is not until the measurement result exceeds a predetermined; value that the cleaning start signal may be output to the fume collector 6 when the next recoating process or cutting process is started. Further, "in operation" of the lamination molding apparatus 1 refers to as a period from a starting point of a first recoating process to termination of molding of a desired three-dimensional article.

The present invention is not limited to the configuration of the embodiments shown in the drawings as in some examples which have been specifically described already and may be variously modified or applied without departing from the spirit of the present invention.

What is claimed is:
1. A lamination molding apparatus comprising:
a chamber that is closed;
a laser radiation apparatus configured to radiate a laser beam to a predetermined irradiation region on a powder material layer formed by uniformly spreading a powder material in the chamber and form a sintered layer; and
an inert gas supply/discharge apparatus configured to supply an inert gas into the chamber such that the chamber is always filled with the inert gas to a predetermined concentration or more and discharge fumes to the outside of the chamber,
wherein the inert gas supply/discharge apparatus includes:
an inert gas supply apparatus configured to supply the inert gas into the chamber; and a fume collector including a charging section having a charging electrode configured to positively or negatively charge the fumes, a charging electrode cleaner configured to remove the fumes adhered to the charging electrode, and a dust collecting section configured to collect the charged fumes, wherein the charging electrode cleaner removes the fumes when formation of the sintered layer is not being performed by the laser radiation apparatus in operation.

2. The lamination molding apparatus according to claim 1, further comprising a control device configured to output a cleaning start signal at a predetermined timing when a radiation process of radiating the laser beam to form the sintered layer is not being performed in operation, wherein the fume collector starts cleaning of the charging electrode using the charging electrode cleaner when the cleaning start signal is input and terminates the cleaning before the next radiation process starts.

3. The lamination molding apparatus according to claim 1, wherein the charging electrode cleaner comprises a nozzle configured to eject the inert gas to the charging electrode.

4. The lamination molding apparatus according to claim 3, wherein the charging electrode cleaner further comprises an intermittent ejection control unit configured to control intermittent ejection of the inert gas from the nozzle.

5. The lamination molding apparatus according to claim 3, wherein the inert gas supply/discharge apparatus further comprises a branch pipe configured to split a supply destination for the inert gas supplied from the inert gas supply apparatus into the chamber and the nozzle.

6. The lamination molding apparatus according to claim 3, wherein the inert gas supply/discharge apparatus further comprises a switching valve configured to switch the supply destination for the inert gas supplied from the inert gas supply apparatus to either the chamber or the nozzle.

* * * * *